March 26, 1946.  J. B. BRENNAN  2,397,121
CORE
Filed Feb. 25, 1942
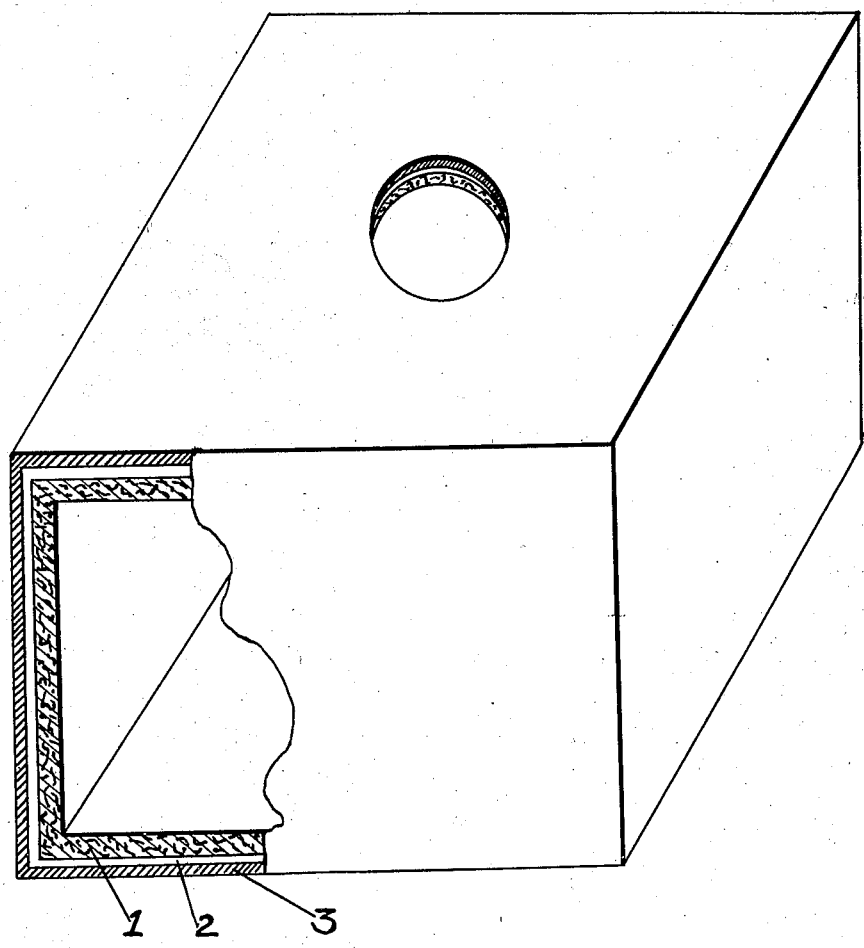
Joseph B. Brennan
INVENTOR.

Patented Mar. 26, 1946

2,397,121

UNITED STATES PATENT OFFICE 2,397,121

CORE

Joseph B. Brennan, Euclid, Ohio

Application February 25, 1942, Serial No. 432,321

8 Claims. (Cl. 18—45)

My invention relates to hollow cores, patterns or forms used as supports for shaping or building and/or curing hollow thermoplastic materials thereon.

In the past such cores of patterns have been made of wood or papier mâché.

The difficulties with wood or papier mâché comprise in part that the exterior of such materials is generally weak, rough, seamed and of such nature that thermoplastic materials when cured thereon develop roughness, surface irregularities, and adhere thereto making it difficult to remove the thermoplastic materials after curing thereupon. In addition to this, shrink and warp generally develops in wood and papier mâché as at present used.

Another disadvantage of papier mâché is that it lacks strength for the type of handling and use required of such forms when of considerable size.

By my invention strength in proportion to size can be regulated accurately and satisfactorily and a slick outside surface is obtained from which thermoplastic articles part readily after curing.

In the practice of my invention I build or assemble in the desired shape at least one layer of fibrous material into an inside hollow form of lesser exterior dimensions than the finished core or pattern is to be. This inside or supporting hollow form may be made of standard corrugated carton material or fiber board or plaster board or papier mâché or of a combination of flexible Fiberglas and plaster of Paris or of sawdust and plaster of Paris or of asbestos and plaster of Paris or of a combination of these. In some cases where exceptionally large hollow forms are required this interior hollow form may be provided with interior supports or may be of a cellular nature or may be filled with materials such as loose sand or sawdust to prevent collapse due to exterior pressure.

This interior form according to my invention is next placed in a hollow mold of wood, metal or other suitable material in such a manner that the interior hollow form is in spaced relation over practically all its exterior of the hollow mold which is of interior shape and size to conform to my finished core or pattern.

Next according to my invention a liquid mix comprising plaster and water and fiber if desired is poured in the space between my hollow interior form and the above mentioned exterior mold in such a manner that the space or interstices are completely filled with such liquid slip which sets quickly at normal temperatures and with little or no shrinkage or expansion and which when set adheres firmly to the interior hollow form about which it is poured and does not adhere appreciably to the exterior mold within which it is formed.

Among fibers most suitable for making the layers of which hollow cores or patterns are made according to my invention I find flexible Fiberglass of less than .0005" diameter preferable because it is of great strength and will withstand elevated temperatures and makes a most inert and strong core.

Thus according to my invention a relatively light and strong laminated core or pattern is produced of two or more layers at least one of which is fibrous and which will withstand hard usage and yet can be broken up and removed from the interior of the hollow thermoplastic material cured thereon.

In case corrugated carton material or paper board is used to form the interior lamination I find it preferable to prepare the exterior surface thereof by perforations or roughening and application of a strengthening and adhesion layer thereto of Plaskon, cold setting cement or a glue or a combination of these because then the relatively brittle plaster surface is better supported by the fibrous lamination if it adheres thereto.

As an example in carrying out my invention I take a hollow carton less in outside dimensions by approximately one-half inch than the desired finished core or pattern, fill this carton with sawdust even full, seal up the carton, perforate its exterior, coat its exterior with a light coat of Plaskon cold setting cement and water and $CaSO_4$ and after drying place carton so filled and treated inside the above mentioned exterior mold of wood or metal completely enclosing said carton and in spaced relation to the exterior walls thereof and pour liquid plaster of Paris and water mix in the interstices so that the carton has a homogeneous lamination thereover and adhering thereto. Next, after setting, the exterior mold is removed and the core or pattern is complete and ready for use. If preferred the sawdust may be removed from the interior of the carton to reduce weight, by providing an opening therefor.

Another example of my invention is to make an interior form of Fiberglas as above specified and water and plaster of Paris by accreting same on a hollow screen or spreading same in a hollow mold so that hollow sections are formed when set, joining these sections together as by use of Plaskon cold setting glue or sodium silicate to make the interior fibrous form and then pouring a skin coat of plaster of Paris mix thereover in the above mentioned exterior mold allowing same to set, and removing therefrom.

Cores made according to my invention are useful in laminating and curing rubber-like thermoplastic hollow containers such as bullet-proof tanks for gasoline thereon, and are readily removed therefrom.

Obviously multiple layers may be needed to gain the strength required of large cores. The alternate brittle plaster layer and the somewhat flexible fibrous layer according to my invention produces a core which facilitates greatly the production of such items as bullet-proof tanks for gasoline.

The exterior coating which must be slick and smooth and heat-resisting is principally of plaster of Paris or some such cast self-setting heat-resisting material which may have short fibers incorporated therein if preferred; but the fiber content if used is preferably a lesser dry weight constituent than the plaster content. The plaster exterior coating may be slicked with talc suspension if desired to facilitate the removal of rubber-like materials therefrom after curing.

In some cases where hollow fibrous forms as of carton material or paper board are used as the basic interior form they may be coated with a reinforcing layer on the inside, as of plaster of Paris.

Multiple layers of paper or card board and/or Fiberglas may be used or paper and/or cardboard or Fiberglas may be sandwiched between plaster layers. In any case I prefer that the exterior be cast of a smooth mix comprising as a principal ingredient a self-setting plaster, which will withstand the elevated temperatures required for curing bullet-proof tanks of rubber-like material. When alternate layers containing fibrous materials are joined together to make the interior supporting basic form for the exterior plaster-like coating these layers of fibrous materials may be made up in sections and cemented or fastened together quickly into an assembled hollow interior form according to my invention. It is comparatively simple to approximate the outside dimensions of the finished core or pattern by joining together pieces of fibrous material to make the interior form. The accuracy, lightness, and strength of the core produced by casting plaster over this seamed interior form is remarkable.

The drawing illustrates by way of an example one form of hollow core and its mode of manufacture, the single figure being a perspective view partly in section.

The drawing shows a hollow form 3 which is utilized for casting the exterior layer 2 of plaster, the latter being provided around the interior layer 1 which is a hollow fibrous interior layer of the core. Thus interior layer 1 and exterior layer 2 comprise the core structure of the invention.

What I claim is:

1. As an article of manufacture a hollow laminated core comprising a fibrous liner enclosed in and attached to a cast coated with a smooth surface layer of adhering plaster.

2. As an article of manufacture a hollow heat-resistant core comprising a fibrous inside form coated with a cast smooth layer of heat-resistant plaster extending entirely over the fibrous inside form.

3. A seamless laminated molded non-shrinking hollow form comprising a supporting interior fibrous structure with a continuous homogeneous plaster coating thereover substantially free from pits, seams, and crevices.

4. A heat-resistant hollow core for casting, comprising a fibrous interior layer, a water-resistant intermediate layer and a smooth plaster outside layer extending entirely over the fibrous layer.

5. A heat-resistant hollow liquid fuel cell core comprising a fibrous interior layer and a smooth cast layer thereover whose principal ingredient is plaster.

6. A heat-resistant hollow core comprising a flexible fibrous layer in combination with a covering of smooth heat-resisting material extending entirely over the fibrous layer.

7. A laminar heat-resistant hollow structure comprising an interiorly fibrous hollow form externally water-resistant and having an exterior layer of plaster fastened thereover by an adhesive action.

8. A pattern core for curing thermoplastic sheet material thereover, comprising a cellular fibrous hollow supporting inside form enclosed in a smooth seamless exterior plaster casement.

JOSEPH B. BRENNAN.